Figure 1:
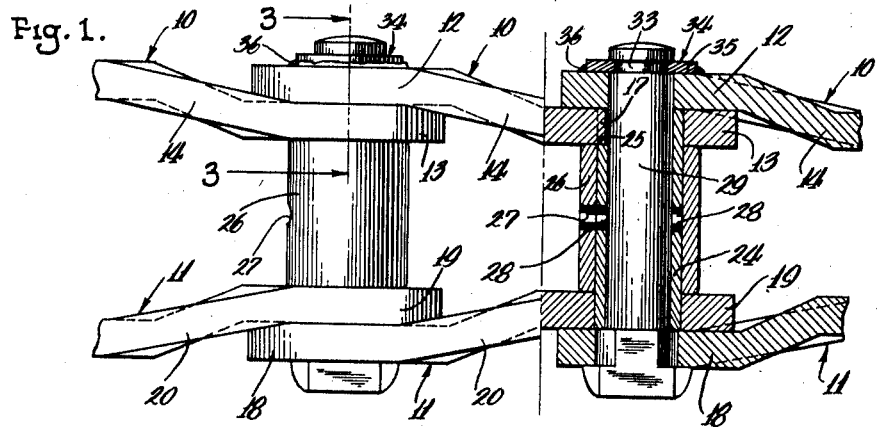

May 26, 1942.   E. F. EMMONS   2,284,565

CHAIN

Filed July 19, 1940

Eugene F. Emmons
INVENTOR

By Freeman, Sweet, and Celbrecht
ATTORNEYS

Patented May 26, 1942

2,284,565

UNITED STATES PATENT OFFICE 2,284,565

CHAIN

Eugene F. Emmons, Sandusky, Ohio, assignor to The Union Chain and Manufacturing Company, Sandusky, Ohio, a corporation of Ohio Application July 19, 1940, Serial No. 346,448

6 Claims. (Cl. 74—251)

This invention relates to chains, more particularly to chains which are subjected to the requirements of hard usage, as for example, usage as a driving medium for equipment in the oil industry, and the principal object of this invention is to provide new and improved chains which will meet these and other chain requirements.

Figure 2:
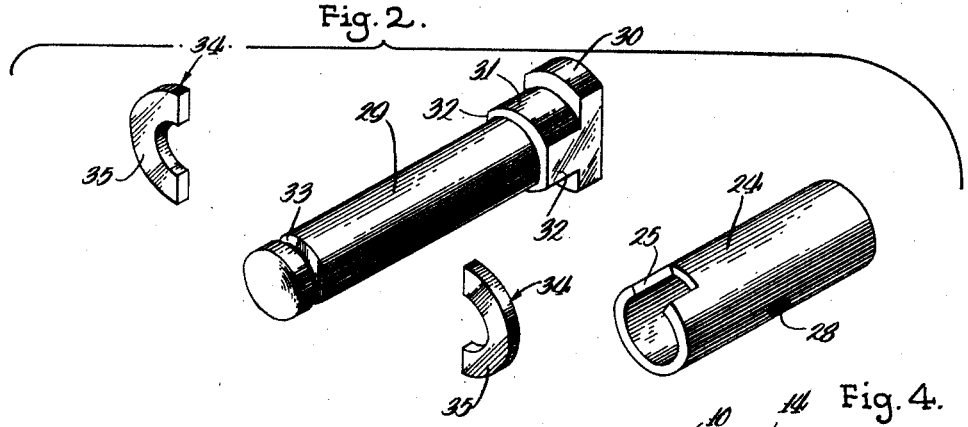
Figure 3:
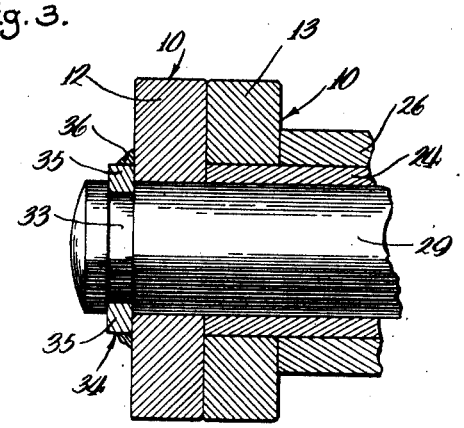
Figure 4:
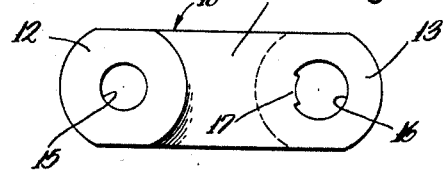
Figure 5:
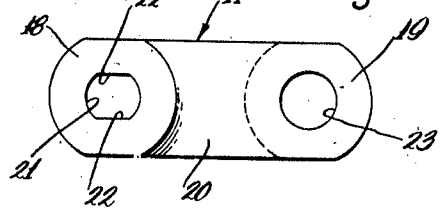

In the drawing accompanying this specification and forming a part of this application, I have shown, for purposes of illustration, an embodiment which my invention may assume, and in the drawing:

Figure 1 is a fragmentary plan view of a chain embodying my invention, a portion of the chain being shown in section, Figure 2 is a perspective view of certain of the chain parts in disassembled relation, Figure 3 is an enlarged sectional view corresponding generally to the line 3—3 of Figure 1, and Figures 4 and 5 are plan views of chain links used in the chain construction.

Referring to the drawing, the embodiment of the invention herein disclosed comprises chain links 10 and 11, the links 10 being connected in series relation, and form one side of the chain construction, and the links 11 are also connected in series relation and form the other side of the chain construction. The links 10 are preferably all alike, and comprise bosses 12 and 13 disposed in offset planes, and connected by an inclined web 14, as best seen in Figure 1. Referring particularly to Figure 4, the boss 12 has a circular aperture 15, whereas the boss 13 has an aperture 16 which is substantially circular but which is formed with a segmental projection 17. The link 11 is similarly formed with bosses 18 and 19 disposed in offset planes and connected by an inclined web 20. The boss 18 is formed with a substantially circular aperture 21, margins thereof being flattened as shown at 22, whereas the boss 19 is formed with a circular aperture 23.

Referring particularly to Figure 1, it will be seen that the links 10 and 11 are arranged in pairs which are disposed in spaced-apart relation, the construction being such that the bosses 12 and 13 of adjoining links 10 are aligned respectively with the bosses 18 and 19 of adjoining links 11. A bushing 24 extends between the aligned bosses 13 and 19, the ends of the bushing fitting, preferably with a force fit, into respective apertures 16 and 23 formed in the bosses 13 and 19. As best seen in Figure 2, one end of the bushing is formed with a slot 25 of such size to closely fit the defining margins of the segmental projection 17, thus positively holding the link 10 against rotation about the bushing 24. Disposed between the bosses 13 and 19 and rotatable about the bushing 24 is a roller 26. The roller may have an oil opening 27, and the bushing 24 is preferably formed with oil openings 28.

The bosses 12 and 18 of respective pairs of links 10 and 11 are positioned outwardly of the bosses 13 and 19, and a chain pin 29, also referred to as a pintle or a cross pin, extends through the aligned apertures of all the bosses as well as through the bushing 24. As best seen in Figure 2, the chain pin 29 is formed with a head 30, and inwardly of the head 30 is a pin portion 31, enlarged with respect to the cross-sectional size of the chain pin proper, but reduced in size with respect to the head 30. The pin portion 31 is formed with opposed flattened surfaces 32 corresponding to the flattened surfaces 22 of the aperture 21 in the boss 18, so as to hold the link 11 against rotation with respect to its corresponding chain pin 29, the pin portion 31 preferably having such cross-sectional size that it fits the aperture 21 with a force fit. The flats 32 conveniently extend across the head 30, as best shown in Figure 2. Spaced inwardly from the opposite end of the chain pin 29 is an annular groove 33, which preferably has a rectangular cross-section as best seen in Figures 1 and 3.

From the construction so far described, it will be clear that the links 10 and 11 are respectively held against rotation about the bushing 24 and the chain pin 29, so that any rotation of adjoining links about the axis of a corresponding chain pin 29 is provided for by the rotation of the chain pin 29 within the bushing 24, thus providing a relatively large bearing surface as contrasted with previous constructions wherein the links rotate directly about the chain pin or the bushing. Such large bearing surface prevents wear which in previous constructions resulted in a reduction in the useful life of a chain.

Means are provided for positively holding respective chain links 10 and 11, the bushing 24, and the chain pin 29 in assembled relation. As shown in the embodiment disclosing this invention, this means comprises collar means 34 formed in sections to facilitate its assembly with respect to the chain parts. As here shown, the collar means is in the form of a split washer-like collar, consisting of similar halves 35, those surfaces of the halves defining the opening through the collar being of such size as to closely fit the surfaces defining the annular groove 35 formed in the chain pin 29.

Referring particularly to Figure 1, it will be seen that the head 30 of the pin 29 is in position to hold the boss 18 of the link 11 against displacement from the chain pin 29, while the other end of the chain pin 29 extends beyond the boss 12 of the corresponding link 10, the annular groove 33 being so positioned that it is just outside of the outwardly directed surface of the boss 12. The collar halves 35 are then assembled with the chain pin 29, as by seating these halves 35 in the annular groove 33. The collar halves 35 are then secured to the adjacent surface of the boss 12, preferably in such manner that these collar halves form a structurally integral part of the boss, the preferable method being to weld as shown at 36, either by spot welding or line welding, these collar halves in collar-forming relation to the adjacent surface of the boss.

In some instances, it is desirable to provide for relatively ready disconnection of adjoining chain links at one or more portions along the chain construction, as for purposes of assembly of the chain with sprocket mechanism, and in these instances it is preferable to substantially permanently connect all adjoining chain links in the manner disclosed by this invention, except at those portions where it is desired to disconnect the chain construction. However, it is to be understood that the split collars, although secured to the links in the manner herein described, may be removed without damaging the corresponding chain pin. This provides a decided advantage over the prior constructions, especially the rivet-type chain pin, since in the event of failure of a bushing or roller, the split collar can be removed, the bushing or roller repaired or replaced, and a new split-collar keeper readily and conveniently assembled with the previously used chain pin.

It will be obvious that the chain construction, as shown in the embodiment disclosed in this invention, is such that the chain parts are held tightly assembled, so that loads on the chain are properly imposed on the component chain parts throughout the life of the chain. The collars 34 are rigidly held in position by the welding connection herein shown, and therefore will not be loosened by forces set up during operation of the chain, particularly vibration caused by chain operation. Each collar 34, by reason of its close fit within the groove 33 and its annular extent beyond the cross-sectional outline of the pin 29, offers considerable area in resistance to a shearing action, such as which might be produced when the chain is subjected to excessive vibration, or when the driving and driven means are not exactly in alignment. Therefore, the chain is particularly suitable for use with equipment used in the oil industry, since this equipment is largely portable and is not too well lined up or anchored in the field.

Referring particularly to Figures 1 and 3, it will be seen that the collars 31 require very little pin extension for an efficient holding action, and thus the ultimate width of the chain is reduced to a minimum, enabling the chain to be used in restricted places. The invention is also desirable from a manufacturing standpoint, since the groove 33 in the pin 29, and the thickness and size of the collar 34 can readily be held to very close tolerances, therefore providing for a close final fit of the parts when assembled, and resulting in a tight assembly of the component chain parts.

The chain parts are easily assembled, and the collars 34, since they are formed in sections, can readily be positioned within the groove 33 formed in the chain pin 29, the connection being economically and efficiently completed by welding the collar sections in collar-forming relation to the adjacent surface of the chain link. Since relative rotation of adjoining links about the axis of the chain pin 29 is provided for by rotation of the pin within the bushing 24, the retaining means formed by the collars 33 will rotate with the chain pin, and therefore the retaining means will not be subjected to strain which might be produced by such rotation.

From the foregoing it will be apparent to those skilled in the art that I have accomplished at least the principal object of my invention, and it also will be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A chain, comprising: adjoining links, each being apertured; chain pin means, extending through the apertures in said adjoining links, thus connecting said adjoining links, said chain pin means having a head at one end and an annular groove rectagular in cross-section at the opposite end; and a washer-like collar, those surfaces adjacent to the opening through said collar closely seating in said groove and said collar being of such diameter that it forms an annular abutment at said opposite end of said chain pin means, thus holding said adjoining links against displacement from assembled relation with respect to said chain pin means, said collar means being formed in halves to facilitate its assembly with said chain pin means, and said halves being welded in collar-forming relation to an adjacent surface of a chain link.

2. A chain, comprising: adjoining links; chain pin means, connecting said adjoining links; and means, holding said adjoining links against displacement from position on said chain pin means, comprising collar means, having portions interengaging with portions of said chain pin means, said collar means being formed in sections to facilitate assembly with said chain pin means, and said collar means sections being welded in collar-forming relation to an adjacent surface of one of said chain links.

3. A chain, comprising: adjoining links; chain pin means, connecting said adjoining links, and having a transverse peripherally extending groove formed adjacent one end thereof; and a washer-like collar, those surfaces adjacent the opening through said collar closely seating in said groove, and at least portions of the periphery of said collar extending beyond the cross-sectional outline of said chain pin means, forming an abutment holding said adjoining links from axial disassembly movement in a direction toward said one end of said chain pin means, said collar being formed in sections, and said sections being welded in collar-forming relation to an adjacent surface of a chain link.

4. A chain, comprising: adjoining links, each being apertured; chain pin means, extending through the apertures in said adjoining links, and connecting said adjoining links, said chain pin means having a peripheral groove formed adjacent one end thereof, said groove in cross-section being defined by a plurality of surfaces generally angularly disposed with respect to each other, and being so constructed and arranged that when said chain pin means is in position connecting said adjoining links, said groove is positioned just outward of the outwardly directed surface of the adjacent one of said adjoining links; and a washer-like collar, those surfaces adjacent to the opening through said collar closely seating in said groove, and said collar being of such peripheral size that it forms an abutment of a size greater than the aperture through said one adjoining link; and a weld connection between said collar and said outwardly directed surface, extending about the periphery of said collar.

5. A chain, comprising: adjoining links, each being apertured; chain pin means, extending through the apertures in said adjoining links, and connecting said adjoining links, said chain pin means having a peripheral groove formed adjacent one end thereof, said groove in cross-section being defined by a plurality of surfaces generally angularly disposed with respect to each other, and being so constructed and arranged that when said chain pin means is in position connecting said adjoining links, said groove is positioned just outward of the outwardly directed surface of the adjacent one of said adjoining links; and a washer-like collar, those surfaces adjacent to the opening through said collar closely seating in said groove, and said collar being of such peripheral size that it forms an annular abutment of a size greater than the aperture through said one adjoining link, said collar being formed in sections to facilitate its assembly with said chain pin means; and a weld connection holding said sections in collar-forming relation, and joining the peripheral surface of said collar to said outwardly directed surface.

6. In combination: chain parts, comprising adjoining links and pin means connecting said links, said pin means having a groove; and holding means, holding said links against displacement from position on said pin means, comprising collar means, in addition to said links and said pin means, fitting said groove, and constructed and arranged to form an abutment engageable with one of said links, and having a fused-metal connection with one of said chain parts.

EUGENE F. EMMONS.